United States Patent
Kim et al.

(10) Patent No.: US 12,268,922 B2
(45) Date of Patent: Apr. 8, 2025

(54) METHOD AND DEVICE WITH EXERCISE ASSISTANCE

(71) Applicant: SAMSUNG ELECTRONICS CO., LTD., Suwon-si (KR)

(72) Inventors: Kyung-Rock Kim, Seoul (KR); Keehong Seo, Seoul (KR); Youngbo Shim, Seoul (KR); Youn Baek Lee, Yongin-si (KR); Jongwon Lee, Suwon-si (KR); Jusuk Lee, Suwon-si (KR); Bokman Lim, Hwaseong-si (KR); Byungjune Choi, Gunpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 270 days.

(21) Appl. No.: 17/082,107

(22) Filed: Oct. 28, 2020

(65) Prior Publication Data
US 2021/0121729 A1    Apr. 29, 2021

(30) Foreign Application Priority Data

Oct. 28, 2019    (KR) .................. 10-2019-0134685

(51) Int. Cl.
*B25J 9/00*    (2006.01)
*A61H 3/00*    (2006.01)
*A63B 21/00*    (2006.01)

(52) U.S. Cl.
CPC ............ *A63B 21/4011* (2015.10); *A61H 3/00* (2013.01); *A63B 21/00181* (2013.01);
(Continued)

(58) Field of Classification Search
CPC .......... A63B 21/4011; A63B 21/00181; A63B 2220/54; A63B 2230/625; A61H 3/00;
(Continued)

(56) References Cited

U.S. PATENT DOCUMENTS

2010/0174218 A1*    7/2010    Shim .................... A61B 5/1107
                                                                482/148
2013/0158445 A1*    6/2013    Kazerooni ............... A61H 3/00
                                                                601/35
(Continued)

FOREIGN PATENT DOCUMENTS

CN    107019619 A    8/2017
JP    2002-301124 A    10/2002
(Continued)

OTHER PUBLICATIONS

Korean Office Action dated Mar. 29, 2024 issued in Korean Patent Application No. 10-2019-134685, English translation has been included.

*Primary Examiner* — Jerrah Edwards
*Assistant Examiner* — Aren Patel
(74) *Attorney, Agent, or Firm* — Harness, Dickey & Pierce, P.L.C.

(57) ABSTRACT

An exercise assist method includes receiving a user input signal comprising exercise setting information from an external device; measuring, based on the user input signal, a joint angle of a hip joint of a user wearing an exercise assist device configured to assist a user in performing a leg movement; and controlling torque of the exercise assist device to be applied to a leg of the user based on the measured joint angle and the exercise setting information.

21 Claims, 10 Drawing Sheets

(52) U.S. Cl.
CPC ....... *B25J 9/0006* (2013.01); *A61H 2003/007* (2013.01); *A61H 2201/165* (2013.01); *A61H 2201/1676* (2013.01); *A61H 2201/5069* (2013.01); *A61H 2230/625* (2013.01); *A63B 2220/54* (2013.01); *A63B 2230/625* (2013.01)

(58) Field of Classification Search
CPC ........ A61H 2003/007; A61H 2201/165; A61H 2201/1676; A61H 2201/5069; A61H 2230/625; B25J 9/0006
See application file for complete search history.

(56) References Cited

U.S. PATENT DOCUMENTS

| | | | |
|---|---|---|---|
| 2016/0270997 A1* | 9/2016 | Little | A61H 1/0266 |
| 2017/0027801 A1* | 2/2017 | Choi | A61B 5/024 |
| 2017/0027802 A1* | 2/2017 | Jang | A61H 1/0244 |
| 2019/0105777 A1* | 4/2019 | Dalley | B25J 9/1615 |
| 2019/0374161 A1* | 12/2019 | Ly | A61F 2/68 |
| 2020/0323726 A1* | 10/2020 | Dalley | A61H 3/00 |

FOREIGN PATENT DOCUMENTS

| | | |
|---|---|---|
| JP | 2014-90799 A | 5/2014 |
| JP | 2017-529161 A | 10/2017 |
| KR | 10-2017-0019175 A | 2/2017 |
| KR | 10-2017-0027448 A | 3/2017 |
| KR | 10-2017-0083829 A | 7/2017 |

* cited by examiner

METHOD AND DEVICE WITH EXERCISE ASSISTANCE

CROSS-REFERENCE TO RELATED APPLICATION

This application claims benefit under 35 U.S.C. § 119(a) of Korean Patent Application No. 10-2019-0134685 filed on Oct. 28, 2019, in the Korean Intellectual Property Office, the entire disclosure of which is incorporated herein by reference for all purposes.

BACKGROUND

1. Field

The following description relates to method and device with exercise assistance.

2. Description of the Related Art

A walking assist device may generally be used in assisting a user needing help walking. A user's need for such assisting devices may arise from, or be attributed to, various reasons, for example, diseases or accidents. In such a case, the walking assist device may be used to assist the user during walking rehabilitation. In addition, aging societies have contributed to a growing number of people who experience inconvenience and pain from reduced muscular strength or joint problems due to aging. Thus, there is a growing interest in walking assist devices that enable elderly users or patients with reduced muscular strength or joint problems to walk with less effort. A walking assist device may be worn on a body of a user to provide the user with power needed to walk, and assist the user with walking in normal gait pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exercise assist method includes receiving a user input signal comprising exercise setting information from an external device; measuring, based on the user input signal, a joint angle of a hip joint of a user wearing an exercise assist device configured to assist a user in performing a leg movement; and controlling torque of the exercise assist device to be applied to a leg of the user based on the measured joint angle and the exercise setting information.

The controlling of the torque may include, in response to a posture of the user being recognized as an initial standing posture based on the measured joint angle, increasing a magnitude of the torque for a first time period.

The controlling of the torque may include, in response to the posture of the user being recognized as a near-standing posture based on the measured joint angle, decreasing the magnitude of the torque for a second time period.

The controlling of the torque may include decreasing the magnitude of the torque for the second time period such that the magnitude of the torque becomes 0 at an end time point of the second time period.

The controlling of the torque may include determining a torque type of the torque to be a resistance torque type or an assistance torque type based on direction of the measured joint angle and the exercise setting information.

The controlling of the torque may include, in response to direction of a joint angle measured from a first leg of the user being a first direction and the torque type determined being the assistance torque type, applying an assistance torque in the first direction; and in response to the direction of the joint angle measured from the first leg being the first direction and the torque type determined being the resistance torque type, applying a resistance torque in a second direction opposite to the first direction.

The controlling of the torque may include, in response to the direction of the joint angle measured from the first leg being the second direction and the torque type being the assistance torque type, applying the assistance torque in the second direction; and in response to the direction of the joint angle measured from the first leg being the second direction and the torque type being the resistance torque type, applying the resistance torque in the first direction.

The controlling of the torque may include determining a magnitude of the torque to be applied to the leg of the user based on direction of the measured joint angle and the exercise setting information.

The user input signal may trigger an exercise assist mode in the exercise assist device based on a start time point determined based on when a user input is generated.

The user input signal may be generated based on any one or any combination of any two or more of a button activation, a user interface manipulation, speech recognition, or gesture recognition.

The exercise setting information may include setting information associated with at least one of a magnitude of torque, a torque type, and a torque variation rate over time, in relation to an exercise for each of a left leg and a right leg of the user.

The exercise assist method may further include in response to respective joint angles of both legs of the user being included in a predefined angle range, canceling an exercise assist mode of the exercise assist device.

In response to the exercise assist mode being canceled, may be not applying the torque to the leg of the user.

A non-transitory computer-readable medium may include computer readable instructions to cause a computer to perform the exercise assist method.

In another general aspect, an exercise assist device includes a communicator, a sensor, a controller, and an actuator. The communicator is configured to receive a user input signal comprising exercise setting information from an external device. The sensor is configured to measure, based on the user input signal, a joint angle of a hip joint of a user wearing an exercise assist device configured to assist a user in performing a leg movement. The controller is configured to generate a control signal to control torque of the exercise assist device to be applied to a leg of the user based on the measured joint angle and the exercise setting information. The actuator is configured to output the torque based on the control signal.

The controller may be further configured to increase a magnitude of the torque for a first time period in response to a posture of the user being recognized as an initial standing posture based on the measured joint angle, and decrease a strength of the torque for a second time period in response to the posture of the user being recognized as a near-standing posture based on the measured joint angle.

The controller may be further configured to determine a torque type of the torque to be a resistance torque type or an assistance torque type based on a direction of the measured joint angle and the exercise setting information.

The user input signal may trigger an exercise assist mode in the exercise assist device based on a start time point based on when a user input is generated.

The controller may be further configured to cancel an exercise assist mode of the exercise assist device when respective joint angles of both legs of the user are all included in a predefined angle range.

In another general aspect, an exercise assist device includes an exercise assist device comprising an extended member, a communicator, a sensor, a controller, and an actuator. The communicator is configured to receive exercise setting information from an external device. The sensor is configured to measure, based on the exercise setting information, a joint angle of a user wearing the exercise assist device during movements of the user. The controller is configured to generate a control signal based on the measured joint angle and the exercise setting information. The actuator is configured to output torque to the extended member based on the control signal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
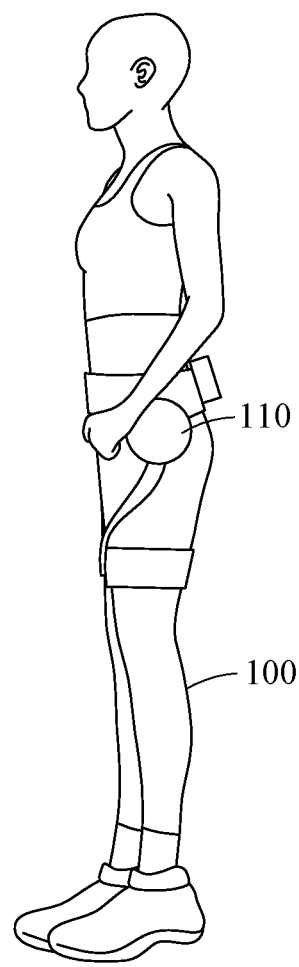
FIG. 1 is a diagram illustrating an example of an exercise assist device worn on a user according to one or more example embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. As non-limiting examples, the terms "comprises," "comprising," "includes," and/or "including," "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of an exercise assist device worn on a user according to one or more example embodiments.

In FIG. 1, an exercise assist device 110 is configured to assist a user 100 wearing the exercise assist device 110 in performing exercises. The exercise assist device 110 may assist and/or support a portion of a leg, or the entire leg, of the user 100, such as during exercises. According to an example, the exercise assist device 110 may supply additional force or load needed when performing a leg exercise to enhance the physical effect, based on a choice made by the user 100. For example, the exercise assist device 110 may provide an assistance torque to an elderly user or a patient with reduced muscular strength or in need of rehabilitation in order to assist them with movement of their leg. The exercise assist device 110 may also provide resistance torque to a user or an athlete that desires to strengthen their muscular using a resistance load. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The exercise assist device 110 may be provided as a wearable exoskeleton, as illustrated in FIG. 1, and configured to apply a force directly to a leg movement when the user 100 moves his/her leg during an exercise, thereby increasing the effect of the exercise. For example, the exercise assist device 110 may be provided as a hip-type device that is worn on a hip joint or thigh of the user 100, as illustrated in FIG. 1. However, the type of the exercise assist device 110 is not limited to the illustrated example and other types may also be applicable to the exercise assist device 110. For example, the exercise assist device 110 may be a compound joint device provided to be worn on an entire leg including a hip, a knee, and an ankle, of the user 100, or a single joint device provided to be worn on a portion of the leg, e.g., a knee or an ankle, of the user 100.

According to an example, the exercise assist device 110 may operate in a walking assist mode to assist the user 100 in walking and/or an exercise assist mode to assist the user 100 in performing an exercise. When the exercise assist device 110 operates in the walking assist mode, the exercise assist device 110 may include the functions of a walking assist device (or a gait assist device). When the exercise assist device 110 operates in the exercise assist mode, the exercise assist device 110 may enable the user 100 to walk for an extended period of time longer than was previously possible, and thus, improve an ability of the user 100 to walk, including improving the gait of the user 100 having a relatively abnormal gait, for example.

According to one or more example embodiments, when the user 100 performs an exercise wearing the exercise assist device 110, the exercise assist device 110 may assist the user 100 in performing the exercise based on the posture of the user 100 in response to a user input signal controlled by the user 100 or a third person. For example, the exercise assist device 110 may assist the user 100 in performing an exercise based on the user input signal and exercise setting information. The exercise setting information may be associated with settings for a particular exercise that the user 100 desires to perform and selections made by the user 100. The exercise setting information may be set to be user-adaptive based on a type of exercise. Based on the exercise setting information, a characteristic, for example, the type and required strength of torque to be output by the exercise assist device 110 may be determined.

Figure 2A:
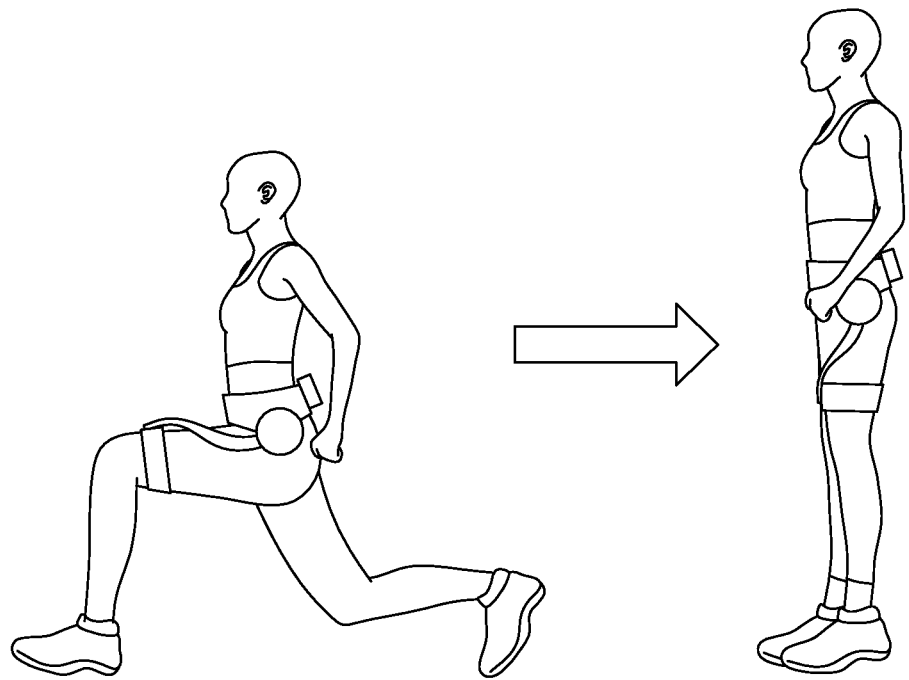
FIGS. 2A through 2C are diagrams illustrating examples of exercises performed by a user wearing an exercise assist device according to one or more example embodiments.
Figure 2B:
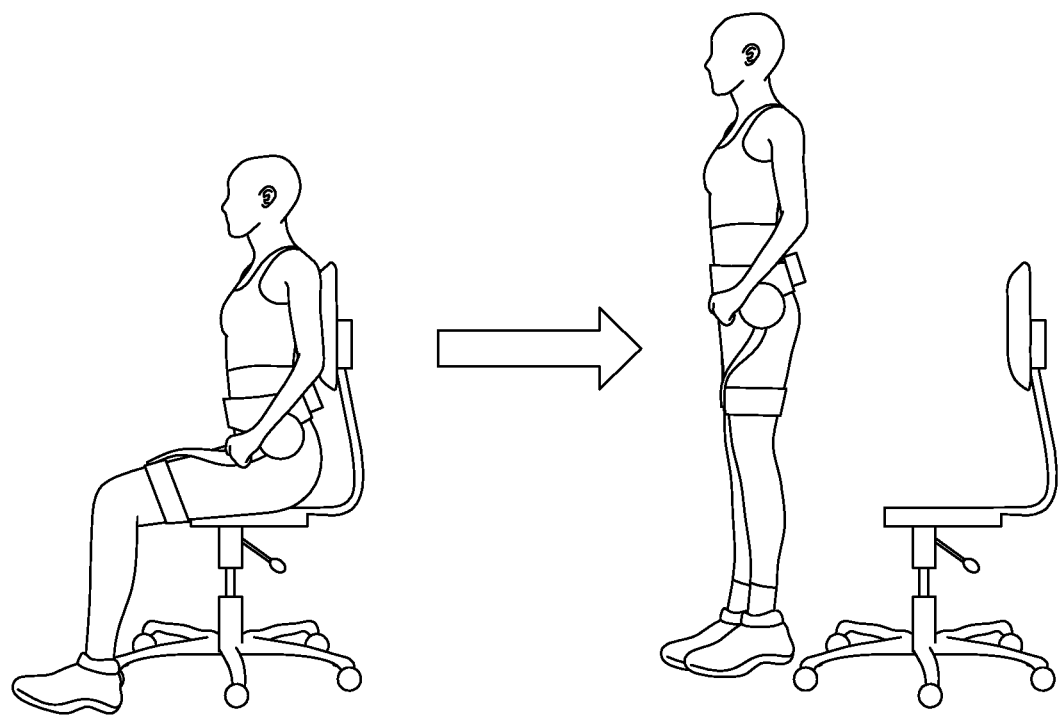
Figure 2C:
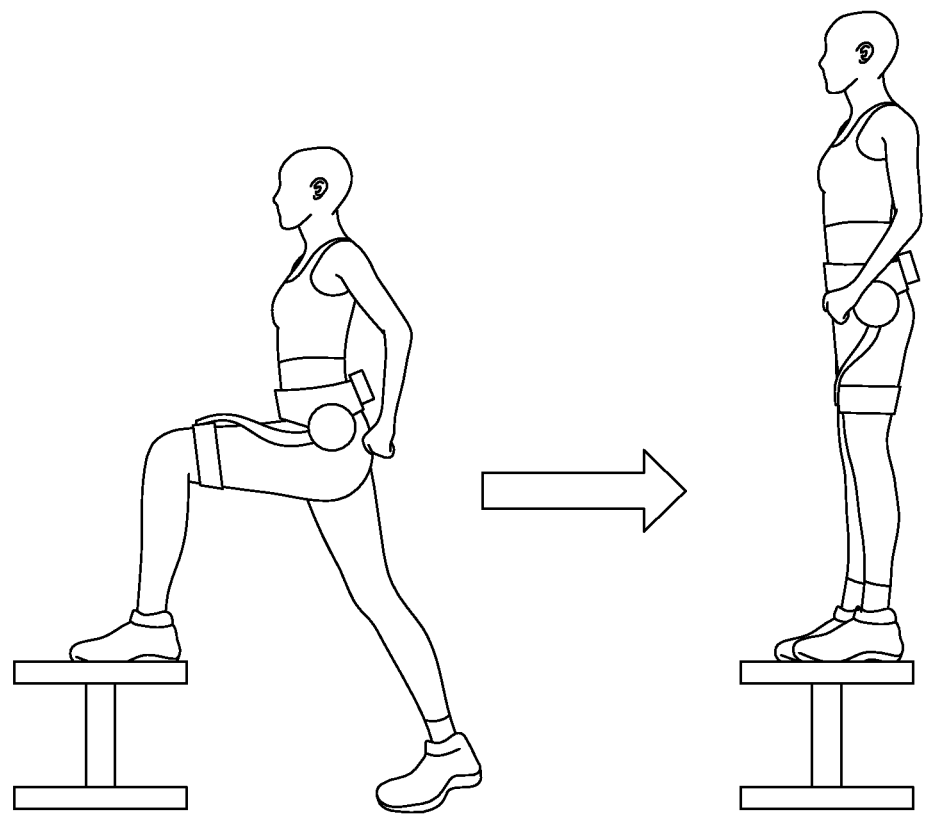

In general, a cycle of each one of various exercises may be completed or ends with a standing posture of the user 100. For example, a cycle of various exercises, for example, a lunge illustrated in FIG. 2A, a sit-to-stand illustrated in FIG. 2B, and a step-up illustrated in FIG. 2C, may be completed or ended with the standing posture of the user 100. By repeating the cycle, including changing motions, the user 100 may improve an exercise effect.

In such exercises, a movement of a hip joint of the user 100 may be broadly classified into an extension, indicating a leg bent forward, and flexion, indicating a leg spread backward. When the user 100 starts performing an exercise, the joint angle of the hip joint of each leg of the user 100 may be determined, and thus, the type of torque to be output for assisting the user 100 in performing the exercise may be readily determined. In addition, all the example exercises may end in a same posture, e.g., a standing posture, and thus, possible to apply, to the exercises, a same criterion for determining the timing of when to stop assisting.

However, automatically and accurately recognizing a starting point and time at which the user 100 starts performing a motion of an exercise may be more difficult. However, when the user 100 signals such starting point and time of the exercise to the exercise assist device 110 through an external device (not shown), the exercise assist device 110 may autonomously provide assistance to the user 100 in performing the exercise based on a joint angle of a hip joint of the user 100. For example, the user 100 may select a starting time point of the exercise by activating a button on the external device (e.g., remote controller, smartphone, tablet PC, and the like) or manipulating a user interface (UI) implemented on the external device, or through speech recognition or gesture recognition. For example, at a time point at which the user 100 presses the button on a remote controller, a user input signal may be generated and the generated user input signal may be transferred to the exercise assist device 110.

The exercise assist device 110 may recognize, as the starting time point of the exercise, a time point at which the user input signal is detected or received. The user 100 may generate a user input signal at each starting time point of a motion involved in the exercise, and the exercise assist device 110 may recognize a start time point of each cycle based on the generated user input signal. Alternatively, when the user 100 defines starting time points for an exercise over repeated user input signals, the exercise assist device 110 may automatically recognize a starting time point of each cycle based on a joint angle of a hip joint of the user 100. For example, the exercise assist device 110 may measure joint angles of hip joints of both legs of the user 100 at the time point at which the user input signal is received, and then may determine the start time point of the exercise when joint angles of hip joints of both legs of the user 100 correspond to the measured joint angles even though a subsequent user input signal is not received.

According to an example, the user 100 may wear the exercise assist device 110, and may perform a rehabilitation program or an exercise program that completes or ends with a standing posture with legs spread with the exercise assist device 110 on. The user 100 or a third person that helps the user 100 with performing an exercise may initially set, in the exercise assist device 110, exercise setting information including, for example, a type, a strength, and a rate of torque to be applied to each of the legs of the user 100. When a user input signal, triggered by the user 100 or the third person while the user 100 is starting a motion start posture, is transmitted to the exercise assist device 110, the exercise assist device 110 may determine a state of a joint angle of both hip joints of the user 100 based on the posture of the user 100 at a time point at which the user input signal is received. The exercise assist device 110 may then determine a strength and/or a direction of torque to be applied to each of the hip joints of the user 100 based on the determined state. During application, when the user 100 stands up and the joint angle of the hip joints becomes 0° or close to 0°, the exercise assist device 110 may automatically stop or suspend assisting the user 100 in performing the exercise.

Figure 3:
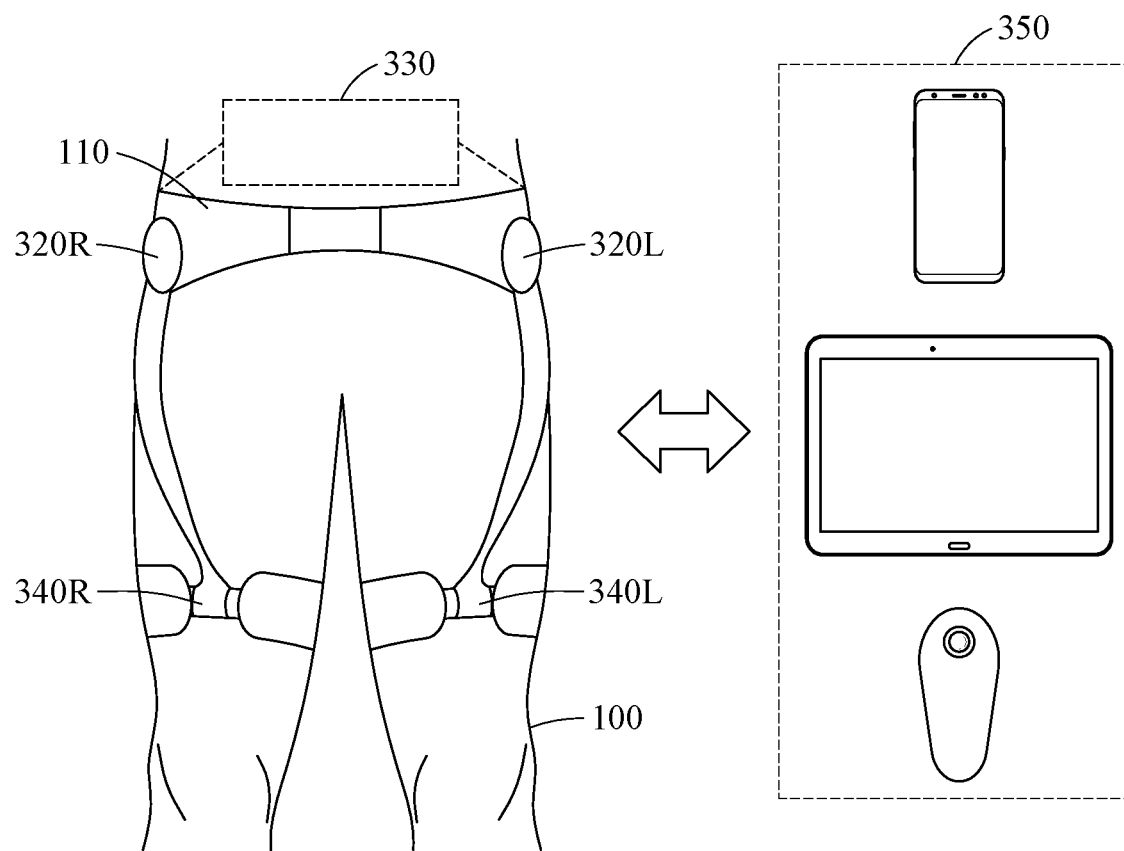
FIG. 3 is a diagram illustrating an example of a structure and a function of an exercise assist device according to one or more example embodiments.

FIG. 3 is a diagram illustrating an example of a structure and a function of an exercise assist device according to one or more example embodiments.

In FIG. 3, the exercise assist device 110 may generate torque at each of left and right hip joints 320L and 320R under the control of a controller 330. The generated torque may provide an assistance torque for extension to push a leg of the user 100 or for flexion to pull a leg of the user 100 through transferrers 340L and 340R disposed above knees of the user 100. The exercise assist device 110 may receive a user input signal corresponding to a motion start point from an external device 350, and measure a joint angle of each of the left and right hip joints 320L and 320R through a sensor in response to the user input signal being received. The exercise assist device 110 may determine direction in which torque is to be provided to each of the legs of the user 100 and an amount of the torque to be provided, at a current point in time, based on the measured joint angle. The external device 350 may be, for example, a remote controller, a personal computer (PC), a laptop, a tablet, a smartphone, a wearable device such as a smartwatch, or other electronic devices.

The controller 330 may determine a torque profile suitable for an exercise to be performed by the user 100 based on exercise setting information and operate an actuator of the exercise assist device 110 based on the determined torque profile. The torque profile may refer to a profile that defines strength and a direction of torque to be output through the actuator based on a change in joint angle or motion of the user 100.

For example, when a posture of the user 100 is recognized as a standing posture based on the joint angle while the controller 330 is providing the torque through the actuator based on the torque profile, the controller 330 may end or suspend assisting the user 100 in performing the exercise. When the controller 330 receives another user input signal again from the external device 350, the controller 330 may measure a change in joint angles of the left and right hip joints 320L and 320R based on a time point at which the user input signal is received, and then provide each leg of the user 100 with torque corresponding to a joint angle at each time point until the assisting of the exercise is ended. When a posture of the user 100 is recognized as the standing posture again, the controller 330 may end assisting the user 100 in performing the exercise. The controller 330 may repeat such operations described above based on the user input signal.

Figure 4:
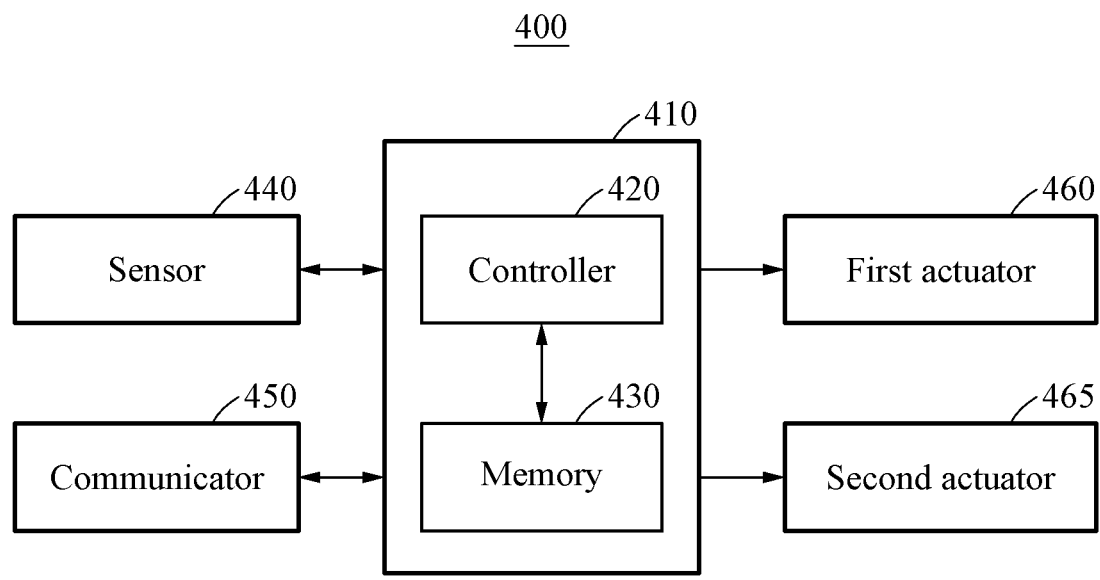
FIG. 4 is a diagram illustrating an example of a configuration of an exercise assist device according to one or more example embodiments.

FIG. 4 is a diagram illustrating an example of a configuration of an exercise assist device according to one or more example embodiments.

In FIG. 4, an exercise assist device 400 includes a control device 410, a sensor 440, a communicator 450, and actuators 460 and 465.

The sensor 440 may include various sensors configured to sense or measure a signal needed for the operation of the exercise assist device 400. For example, the sensor 440 may include a sensor configured to measure a gait phase, a movement or a motion, and a joint angle of a user wearing the exercise assist device 400. The sensor 440 may include, for example, an acceleration sensor, a motion sensor, a tilt sensor, an angle measurement sensor, a gyro sensor, a torque sensor configured to measure torque transferred through the actuators 460 and 465, a current/voltage sensor, and the like.

The communicator 450 may communicate with an external device disposed separately of the exercise assist device 400. For example, the communicator 450 may receive, from the external device, a control signal and/or exercise setting information associated with a characteristic of an exercise. According to an example, the communicator 460 may receive, from the external device, a user input signal corresponding to a motion start point or a trigger point. The external device may provide the user with a UI that enables user control or settings for the exercise assist device 400. Through the UI, the user may control an operation of the exercise assist device 400 or set an exercise environment or condition, for example, exercise intensity and exercise time, to be suitable for the taste or style of the user.

The actuators may output torque based on a torque control signal generated by a controller 420. The actuators may provide a predetermined force, for example, an assistance torque or a resistance torque, required or desired to move each of both hip joints of the user. The actuators may convert electrical energy to kinetic energy, and apply the kinetic energy to a body of the user to provide the user with force needed for the user to move or to provide the user with force needed to hinder a movement of the user. The actuators may include a first actuator 460 configured to provide a force required or desired to move a hip joint corresponding to a right leg of the user, and a second actuator 465 configured to provide a force required or desired to move a hip joint corresponding to a left leg of the user.

The control device 410 configured to control an overall operation of the exercise assist device 400 includes the controller 420 and a memory 430. The memory 430 may be connected to the controller 420, and configured to store instructions to be executed by the controller 420, and data to be processed by the controller 420 and/or data having been processed by the controller 420. For example, the memory 430 may include a non-transitory computer-readable storage medium, for example, a high-speed random-access memory (RAM) and/or a nonvolatile computer-readable storage medium (e.g., at least one disk storage device, flash memory device, or other nonvolatile solid-state memory devices).

The controller 420 may generate a control signal to control the exercise assist device 400. For example, the controller 420 may generate a torque control signal to control torque to be provided by the exercise assist device 400 based on a movement of the user measured by the sensor 440. The controller 420 may perform one or more, or all, of operations and functions of an exercise assist device, described herein. The exercise assist device 400 may operate in one operation mode between an exercise assist mode in which the exercise assist device 400 assists the user in performing an exercise and a walking assist mode in which the exercise assist device 400 assists the user in walking. The controller 420 may control operation and a function of the exercise assist device 400 in each operation mode.

The controller 420 may be implemented using processing circuitry such as hardware, including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a system-on-chip (SoC), a programmable logic unit, a microprocessor, or an application-specific integrated circuit (ASIC), etc.

For example, the exercise assist device 400 may receive, from the user, a user choice input for the operation mode of the exercise assist device 400. In this example, an operation algorithm for each operation mode may be provided in advance in the exercise assist device 400, and each operation mode may be performed according to the provided operation algorithm. The controller 420 may control or allow the exercise assist device 400 to operate according to the user choice input.

When the walking assist mode is selected as the operation mode, the controller 420 may execute an algorithm to determine an assistance torque to assist the user in walking. The controller 420 may estimate a gait cycle of the user based on sensing information measured by the sensor 440, and generate a torque control signal based on a gait phase or a gait state of the user based on the estimated gait cycle. The controller 420 may determine a state variable indicating the gait phase of the user based on a walking movement of the user, and control the actuators 460 and 465 based on the determined state variable. The controller 420 may set a parameter to control the assistance torque based on the state variable, and output the torque control signal to assist the user in walking based on the set parameter.

When the exercise assist mode is selected as the operation mode, the controller 420 may execute an algorithm to assist the user in performing an exercise. For example, when the communicator 450 receives a user input signal from the external device, the controller 420 may execute the exercise assist mode of the exercise assist device 400 in response to the user input signal being received, and the sensor 440 may measure a joint angle of a hip joint of the user wearing the exercise assist device 400. The user input signal may refer to a signal that notifies a start point of motion of the exercise based on a time point at which user input is generated.

The controller 420 may generate a control signal to control torque to be applied to a leg of the user based on the joint angle measured by the sensor 440 and exercise setting information. The actuators 460 and 465 may output the torque based on the control signal received from the controller 420. The controller 420 may determine a torque profile for a muscular exercise based on a movement of the user, and the actuators 460 and 465 may output torque based on the determined torque profile. The torque profile may include an assistance torque profile to provide an assistance torque to support a leg movement of the user, and a resistance torque profile to provide a resistance torque to hinder the leg movement of the user.

The user may select a torque profile to be applied to an exercise the user desires to perform from a list of available torque profiles, e.g., the assistance torque profile and the resistance torque profile, and information associated with the selection may be included in the exercise setting information. The user may set parameters associated with an operation in the exercise assist mode, and the information associated with the set parameters may be stored as the exercise setting information. For example, the user may set, for example, a type of torque (e.g., assistance torque or resistance torque) to be output through each of the actuators 460 and 465, a torque strength, and a torque variation rate for each type of an exercise the user desires to do, and such set parameters may be stored in the exercise setting information.

According to an example, the controller 420 may control the exercise assist device 400 to operate in the exercise assist mode until a particular operation or motion of the user is recognized from a time point at which the user input signal is received from the external device. For example, under the control of the controller 420, the exercise assist device 400 may operate in the exercise assist mode until a posture of the user is recognized as a standing posture from the time point at which the user input signal is received. In this example, the controller 420 may recognize the standing posture of the user based on a joint angle measured by the sensor 440. For example, when joint angles of both hip joints of the user are all 0° or are included in an angle range close to 0°, the posture of the user may be recognized as the standing posture.

The controller 420 may determine a type of torque to be applied to a leg of the user, e.g., between the assistance torque and the resistance torque and strength of the torque, based on the direction of the joint angle measured by the sensor 440 and the exercise setting information. For example, when the posture of the user is recognized as an initial standing posture based on the joint angle measured by the sensor 440 after the user input signal is received, the controller 420 may increase the strength of the torque for a first time period. Thus, the strength of the torque output through at least one of the actuators 460 and 465 may increase gradually for the first time period. The first time period may refer to a time period starting from a time point at which the posture of the user is recognized as the initial standing posture to a time point at which particular time duration elapses. The time duration may be a predefined time duration or time duration set by the user.

After the first time period, the controller 420 may control torque based on a target torque profile. The target torque profile may refer to a torque profile that is defined based on a type of exercise performed by the user and the exercise setting information. The controller 420 may determine whether the posture of the user changes to the standing posture based on the joint angle measured by the sensor 440 while controlling the torque based on the target torque profile. When the posture of the user is recognized as changed to a near-standing posture, the controller 420 may decrease the strength of the torque for a second time period. Thus, the strength of the torque output through at least one of the actuators 460 and 465 may decrease gradually for the second time period. The second time period may refer to a time period starting from a time point at which the posture of the user is recognized as the near-standing posture to a time point at which particular time duration elapses. The time duration may be predefined time duration or time duration set by the user.

When the joint angle corresponding to both legs of the user is included in a predefined angle range corresponding to a complete standing posture, the controller 420 may cancel the exercise assist mode of the exercise assist device 400. Herein, the terms "initial standing posture," "near-standing posture," and "complete standing posture" indicate a posture of the user assumed when the user starts to stand, a posture of the user assumed when the user almost stands up, and a posture of the user assumed when the user stands upright, respectively. In addition, the complete standing posture may also be simply referred to as the standing posture. For example, when joint angles of both hip joints are all 0° or approximately 0°, the controller 420 may cancel the exercise assist mode. When the exercise assist mode is canceled, torque may not be provided by the actuators 460 and 465, and the exercise assist device 400 may operate in a standby mode. Afterward, when the exercise assist device 400 receives a user input signal corresponding to a motion start point or a trigger point from the external device through the communicator 450, the exercise assist device 400 may perform again the operations described above.

Through such operations, the exercise assist device 400 may assist the user wearing the exercise assist device 400 in performing an exercise according to a posture of the user based on a user input signal that is defined externally, and may thus improve an exercise effect and enable user-adaptive exercise assistance.

Figure 5:
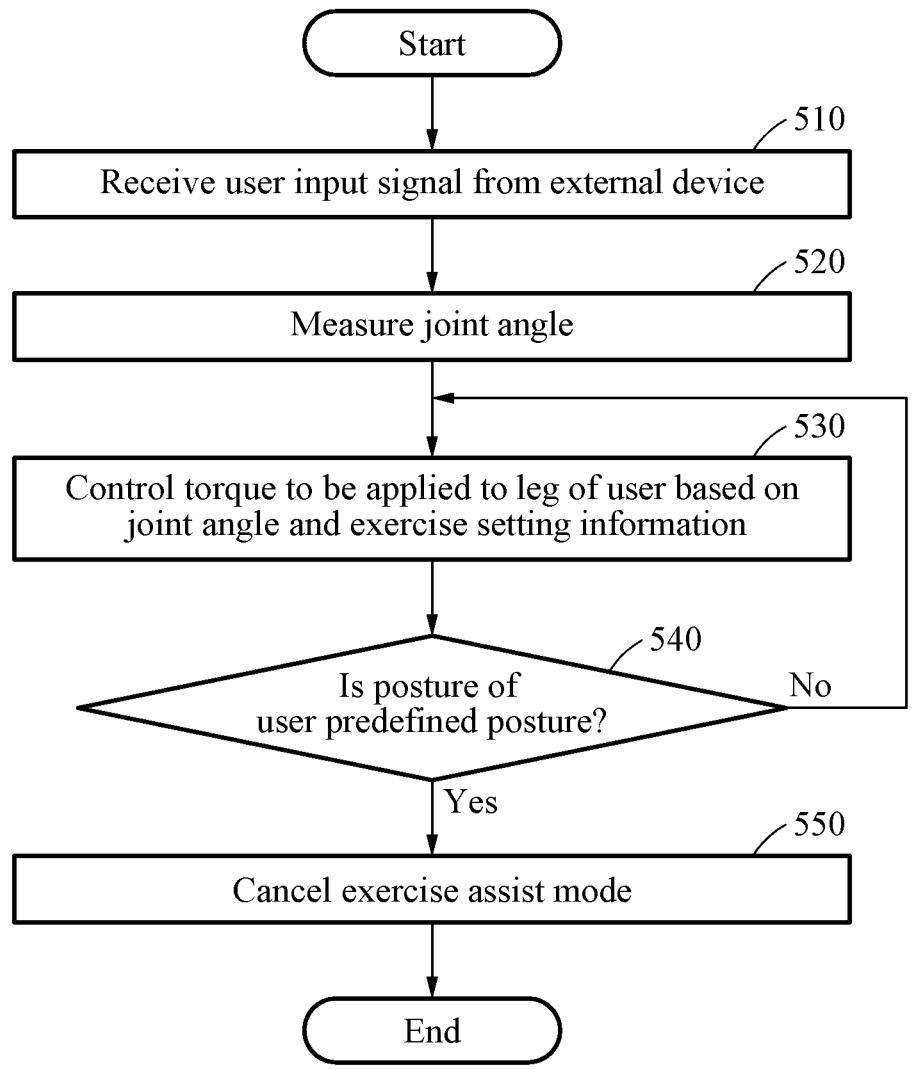
FIG. 5 is a flowchart illustrating an example of an exercise assist method according to one or more example embodiments.

FIG. 5 is a flowchart illustrating an example of an exercise assist method according to one or more example embodiments. The exercise assist method may be performed by an exercise assist device described herein.

In FIG. 5, in operation 510, the exercise assist device receives a user input signal from an external device. The user input signal may be a signal that is input to trigger an exercise assist mode at a time point (as a start point) at which the input is generated. The user input signal may be input through any one or any combination of any two or more of a button activation, including button switching and button pressing, UI manipulation, speech recognition, or gesture recognition, for example.

In operation 520, the exercise assist device measures a joint angle of a hip joint of a user wearing the exercise assist device in response to the user input signal being received. For example, the exercise assist device may measure joint angles of both hip joints through a sensor based on a time point at which the user input signal is received.

In operation 530, the exercise assist device controls torque to be applied to a leg of the user based on the measured joint angle and exercise setting information. When a posture of the user is recognized as an initial standing posture based on the measured joint angle, the exercise assist device may gradually increase the strength or magnitude of the torque for a first time period. The exercise setting information may include setting information associated with, for example, a strength of torque for an exercise of each of a left leg and a right leg of the user, a type of the torque, and a torque variation rate over time.

For example, the exercise assist device may determine a torque type of torque to be applied to the leg of the user, e.g., between an assistance torque type and a resistance torque type, and determine the strength or magnitude of the torque, based on a direction of the measured joint angle and the exercise setting information. In this example, when a direction of a joint angle measured from the left leg of the user is a first direction and the torque type determined based on the exercise setting information is the resistance torque type, the exercise assist device may apply a resistance torque in a second direction opposite to the first direction. When the direction of the joint angle measured from the left leg of the user is the first direction and the torque type determined based on the exercise setting information is the assistance torque type, the exercise assist device may apply an assistance torque in the first direction. In addition, when the direction of the joint angle measured from the left leg of the user is the second direction and the torque type determined based on the exercise setting information is the assistance torque type, the exercise assist device may apply the assistance torque in the second direction. When the direction of the joint angle measured from the left leg of the user is the second direction and the torque type determined based on the exercise setting information is the resistance torque type, the exercise assist device may apply the resistance torque in the first direction. The exercise assist device may also control torque as described in the foregoing for the right leg of the user.

When the posture of the user is recognized as a near-standing posture based on the measured joint angle, the exercise assist device may decrease the strength of the torque for a second time period. For example, the exercise assist device may gradually decrease the strength of the torque for the second time period such that the strength of the torque to be transferred to the leg of the user becomes 0 at an end time point of the second time period. The first time period and the second time period may be time periods defined previously, or time periods set by the user.

In operation 540, the exercise assist device determines whether the posture of the user is a predefined posture based on the joint angle measured through the sensor. For example, the exercise assist device may determine whether the posture of the user is a complete standing posture or a near-standing posture. In this example, when joint angles of both hip joints of the user are all 0°, the exercise assist device may determine the posture of the user to be the complete standing posture, which is also referred to herein as a standing posture. When the joint angles are included in an angle range close to 0°, the exercise assist device may determine the posture of the user to be the near-standing posture. When the posture of the user does not correspond to the predefined posture, the exercise assist device may continue to perform operation 530 to control torque.

In operation 550, when the posture of the user corresponds to the predefined posture, the exercise assist device cancels the exercise assist mode of the exercise assist device. When the exercise assist mode is canceled, the exercise assist device may not apply the torque to the leg of the user. Afterward, when the exercise assist device receives again a user input signal from the external device while operating in a standby mode, the exercise assist device may perform the operations described above.

Figure 6:
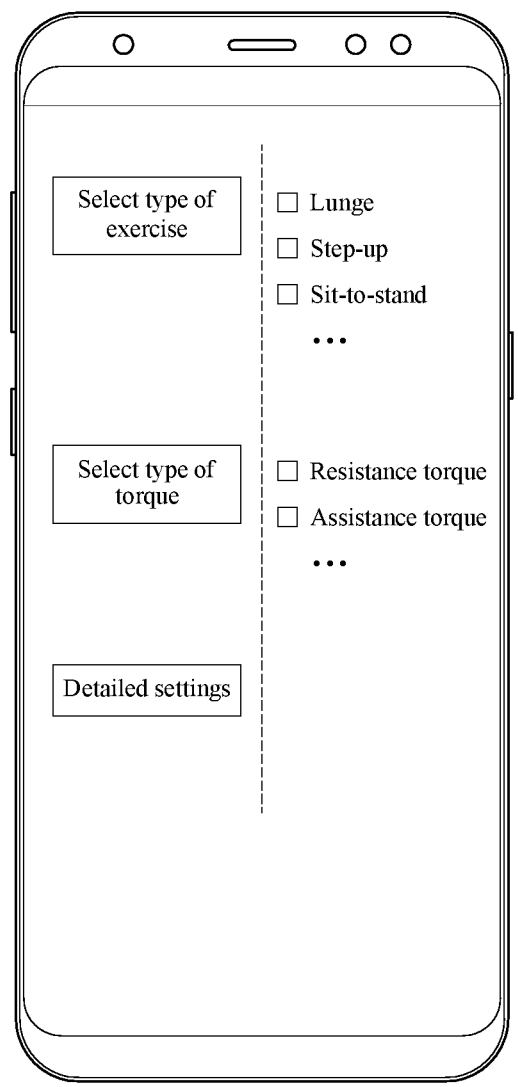
FIG. 6 is a diagram illustrating an example of a screen of a user interface (UI) used to enter and determine exercise setting information according to one or more example embodiments.

FIG. 6 is a diagram illustrating an example of a screen of a UI used to determine exercise setting information according to one or more example embodiments.

In FIG. 6, through a UI, a user may conveniently set detailed exercise setting information. For example, the user may directly set a type of an exercise the user desires to do (e.g., lunge, step-up, sit-to-stand, etc.), a type and the strength or magnitude of torque (e.g., resistance torque, assistance torque, etc.), a torque variation rate over time, and the like. In addition, the user may set the detailed exercise setting information for each leg or each exercise. The exercise setting information set through the UI may be transmitted to an exercise assist device, and the exercise assist device receiving the exercise setting information may perform an exercise assist operation based on the received exercise setting information.

Figure 7:
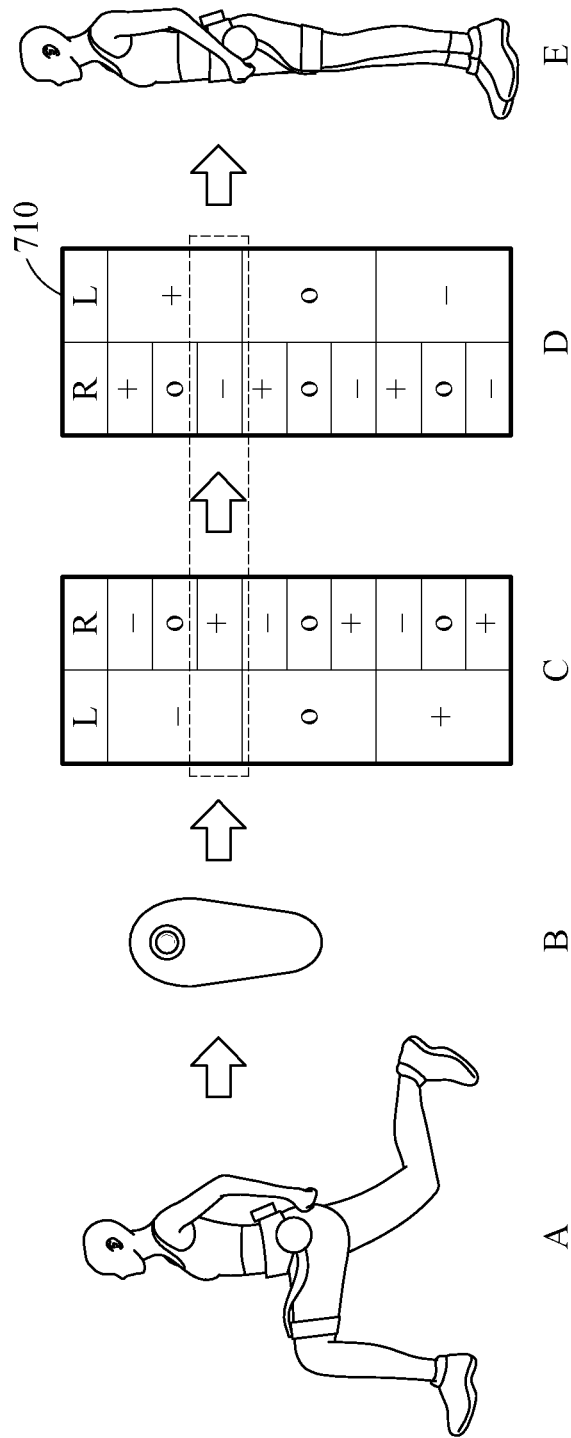
FIG. 7 is a diagram illustrating an example of an exercise assist method according to one or more example embodiments.

FIG. 7 is a diagram illustrating an example of an exercise assist method according to one or more example embodiments.

In FIG. 7, a user performs an exercise with an exercise assist device on. The user may perform an exercise, for example, a lunge, a step-up, and a sit-to-stand, more effectively through assistance provided by the exercise assist device. In the example of FIG. 7, the user performs a lunge exercise with the exercise assist device on.

As illustrated in FIG. 7, in step A, the user assumes a lowering posture with legs spreading to perform one of the motions included in the lunge exercise. In step B, the user or a third person generates a user input signal through an external device while the user is keeping the lowering posture as in step A. For example, the user or the third person may generate the user input signal by pressing a button on a remote controller. The user input signal generated in the external device may be transmitted to the exercise assist device worn on the user, and the exercise assist device may execute an exercise assist mode in response to the user input signal being received.

Subsequently, in step C, the exercise assist device measures joint angles of both hip joints at a time point at which the user input signal is received. Here, for a joint angle, when a joint angle measured when the user stands upright is 0°, an angle direction when a leg of the user steps forward may be defined as a negative (−) direction, and an angle direction when the leg of the user steps backward may be defined as a positive (+) direction. Based on such a definition, when the user assumes the lowering posture in step A, a joint angle of a hip joint corresponding to a left leg of the user corresponds to the negative direction, and a joint angle of a hip joint corresponding to a right leg of the user corresponds to the positive direction.

In step D, the exercise assist device controls torque to be applied to both legs of the user based on directions of the measured joint angles and exercise setting information. A torque direction profile 710 to be applied to the exercise performed by the user may be determined based on a type of exercise and the exercise setting information. In the example of FIG. 7, an assistance torque type is selected for the lunge exercise. In this example, the exercise assist device may generate an assistance torque to support a movement of the user while the user is performing the exercise, and the user may receive a force in the same direction as a direction in which a leg of the user moves and may thus more readily perform the movement.

The exercise assist device may determine a direction of torque to be applied to both legs of the user based on a currently measured joint angle of a hip joint of the user and on the torque direction profile 710. In a case of the joint angles measured in step C, the joint angle of the hip joint corresponding to the left leg of the user corresponds to the negative direction, and the joint angle of the hip joint corresponding to the right leg of the user corresponds to the positive direction. The exercise assist device may apply torque to the right leg (indicated as R) in the negative direction and apply torque to the left leg (indicated as L) in the positive direction, based on the torque direction profile 710. This is indicated by a box marked by a broken line. However, when a resistance torque type is selected, the exercise assist device may apply torque to the right leg (indicated as R) in the positive direction and apply torque to the left leg (indicated as L) in the negative direction, based on the directions of the joint angles. In addition, the exercise assist device may control the torque to be provided to the user based on a torque variation rate over time, a maximum torque strength, and the like that are defined in the exercise setting information.

In step E, when the user assumes a standing posture, the exercise assist device recognizes the posture of the user as the standing posture based on the joint angles. For example, when the joint angles of both hip joint of the user are all 0° or have values close to 0, the exercise assist device may estimate the posture of the user as the standing posture. When the posture of the user is recognized as the standing posture, the exercise assist device may cancel the exercise assist mode. When the exercise assist mode is canceled, torque may not be provided to the user. Afterward, when the user performs a motion of the lunge exercise as in step A and generates a user input signal again, the exercise assist device may perform again the operations described above in steps C through E.

Figure 8:
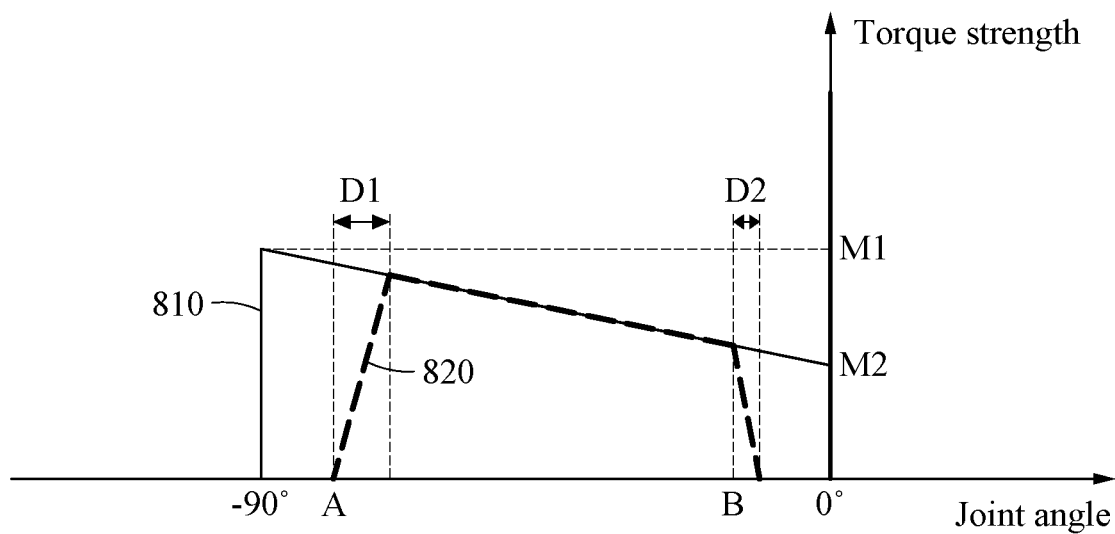
FIG. 8 is a diagram illustrating an example of controlling torque based on a change in a posture of a user according to one or more example embodiments.

FIG. 8 is a diagram illustrating an example of controlling torque based on a change in the posture of a user according to one or more example embodiments.

FIG. 8 illustrates a torque profile 820 to be applied to an exercise performed by a user to change a bending or lowering posture to a standing posture. When a standing motion performed by the user is recognized at a time point A, an exercise assist device may increase strength of torque for a first time period D1 from a time point at which a user input signal is received from an external device. Here, the time point A may correspond to the time point at which the user input signal is received from the external device. When the strength of the torque reaches a strength of a target torque profile 810 at an end time point of the first time period D1, a strength of torque to be provided to the user may be controlled based on the target torque profile 810. For example, the target torque profile 810 may have a maximum torque strength M1 and a minimum torque strength M2 that are defined in advance, and be a torque profile of which a strength decreases gradually as a joint angle is closer to 0°. In addition, when the posture of the user is recognized as the standing posture or a near-standing posture at a time point B based on the joint angle, the exercise assist device may gradually decrease the strength of the torque such that the strength of the torque becomes 0 at an end time point of a second time period D2. The maximum torque strength M1, the minimum torque strength M2, a time length of the first time period D1, a time length of the second time period D2, and a torque variation rate over time may be adaptively set by the user or a third person, and such set information may be stored in exercise setting information.

The sensor 440, communicator 450, control device 410, controller 420, memory 430, first actuator 460, and second actuator 465 of FIGS. 1-8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An exercise assist method, comprising:
    receiving a user input signal from an external device;
    measuring, in response to the user input signal being received, a joint angle of a hip joint of a user wearing an exercise assist device configured to assist the user in performing a leg movement; and
    controlling torque of the exercise assist device to be applied to a leg of the user based on the measured joint angle,
    wherein the controlling of the torque of the exercise assist device comprises,
        controlling the exercise assist device to operate in an exercise assist mode and increase a magnitude of the torque for a first time period whenever the measured joint angle corresponds to the joint angle of the hip joint of the user at a time point at which the user input signal was previously received, and
        controlling the exercise assist device to operate in a standby mode and decrease the magnitude of the torque for a second time period whenever a standing posture of the user is recognized based on the measured joint angle.

2. The exercise assist method of claim 1, wherein the controlling of the torque comprises:

in response to a posture of the user being recognized as an initial standing posture based on the measured joint angle, increasing a magnitude of the torque for the first time period.

3. The exercise assist method of claim 2, wherein the controlling of the torque comprises:
in response to the posture of the user being recognized as a near-standing posture based on the measured joint angle, decreasing the magnitude of the torque for the second time period.

4. The exercise assist method of claim 3, wherein the controlling of the torque comprises:
decreasing the magnitude of the torque for the second time period such that the magnitude of the torque becomes 0 at an end time point of the second time period.

5. The exercise assist method of claim 1, wherein the controlling of the torque comprises:
determining a torque type of the torque to be a resistance torque type or an assistance torque type based on a direction of the measured joint angle and exercise setting information.

6. The exercise assist method of claim 5, wherein the controlling of the torque comprises:
in response to a direction of a joint angle measured from a first leg of the user being a first direction and the torque type determined being the assistance torque type, applying an assistance torque in the first direction; and
in response to the direction of the joint angle measured from the first leg being the first direction and the torque type determined being the resistance torque type, applying a resistance torque in a second direction opposite to the first direction.

7. The exercise assist method of claim 6, wherein the controlling of the torque comprises:
in response to the direction of the joint angle measured from the first leg being the second direction and the torque type being the assistance torque type, applying the assistance torque in the second direction; and
in response to the direction of the joint angle measured from the first leg being the second direction and the torque type being the resistance torque type, applying the resistance torque in the first direction.

8. The exercise assist method of claim 1, wherein the controlling of the torque comprises:
determining a magnitude of the torque to be applied to the leg of the user based on a direction of the measured joint angle and exercise setting information.

9. The exercise assist method of claim 1, wherein the user input signal triggers the exercise assist mode in the exercise assist device based on a start time point determined based on when a corresponding user input was generated.

10. The exercise assist method of claim 1, wherein receipt of the user input signal is dependent on any one or any combination of any two or more of a button activation, a user interface manipulation, speech recognition, or gesture recognition.

11. The exercise assist method of claim 5, wherein the exercise setting information includes setting information associated with at least one of a magnitude of torque, a torque type, and a torque variation rate over time, in relation to an exercise for each of a left leg and a right leg of the user.

12. The exercise assist method of claim 1, further comprising:
in response to respective joint angles of both legs of the user being included in a predefined angle range, canceling the exercise assist mode of the exercise assist device.

13. The exercise assist method of claim 12, wherein, in response to the exercise assist mode being canceled, not applying the torque to the legs of the user.

14. A non-transitory computer-readable storage medium storing instructions that, when executed by a processor, cause the processor to perform the exercise assist method of claim 1.

15. The exercise assist method of claim 5, wherein
the exercise setting information includes information associated with parameters set in association with an operation in the exercise assist mode, and
the parameters include at least one of a type, a strength, and a rate of torque to be applied to the leg of the user.

16. An exercise assist device, comprising:
a communicator configured to receive a user input signal from an external device;
a sensor configured to measure, in response to the user input signal being received, a joint angle of a hip joint of a user wearing the exercise assist device configured to assist the user in performing a leg movement;
a controller configured to generate a control signal to control torque of the exercise assist device to be applied to a leg of the user based on the measured joint angle; and
an actuator configured to output the torque based on the control signal,
wherein the controller is further configured to control the torque of the exercise assist device by
controlling the exercise assist device to operate in an exercise assist mode and increase a magnitude of the torque for a first time period whenever the measured joint angle corresponds to the joint angle of the hip joint of the user measured at a time point at which the user input signal was previously received, and
controlling the exercise assist device to operate in a standby mode and decrease the magnitude of the torque for a second time period whenever a standing posture of the user is recognized based on the measured joint angle.

17. The exercise assist device of claim 16, wherein the controller is further configured to:
increase a magnitude of the torque for the first time period in response to a posture of the user being recognized as an initial standing posture based on the measured joint angle; and
decrease a strength of the torque for the second time period in response to the posture of the user being recognized as a near-standing posture based on the measured joint angle.

18. The exercise assist device of claim 16, wherein the controller is further configured to determine a torque type of the torque to be a resistance torque type or an assistance torque type based on a direction of the measured joint angle and exercise setting information.

19. The exercise assist device of claim 16, wherein the user input signal triggers the exercise assist mode in the exercise assist device based on a start time point based on when a user input is generated.

20. The exercise assist device of claim 16, wherein the controller is further configured to cancel the exercise assist mode of the exercise assist device when respective joint angles of both legs of the user are all determined to be within a predefined angle range.

21. An exercise assist device having an extended member, comprising:
- a communicator configured to receive a user input signal from an external device;
- a sensor configured to measure, in response to a user input signal being received, a joint angle of a hip joint of a user wearing the exercise assist device;
- a controller configured to generate a control signal based on the measured joint angle; and
- an actuator configured to output torque to the extended member based on the control signal,
- wherein the controller is further configured to control the torque by
  - controlling the exercise assist device to operate in an exercise assist mode and increase a magnitude of the torque whenever the measured joint angle corresponds to the joint angle of the hip joint of the user measured at a time point at which the user input signal was previously received, and
  - controlling the exercise assist device to operate in a standby mode and decrease the magnitude of the torque whenever a standing posture of the user is recognized based on the measured joint angle.

* * * * *